(12) United States Patent
Swix et al.

(10) Patent No.: US 6,718,551 B1
(45) Date of Patent: Apr. 6, 2004

(54) METHOD AND SYSTEM FOR PROVIDING TARGETED ADVERTISEMENTS

(75) Inventors: Scott R. Swix, Duluth, GA (US); John R. Stefanik, Atlanta, GA (US); John C. Batten, San Jose, CA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 0 days.

(21) Appl. No.: 09/467,889

(22) Filed: Dec. 21, 1999

Related U.S. Application Data

(63) Continuation-in-part of application No. 08/779,306, filed on Jan. 6, 1997, now abandoned.

(51) Int. Cl.[7] .............................................. H04N 7/025
(52) U.S. Cl. .............................. 725/32; 725/35; 725/9; 725/16
(58) Field of Search ........................... 725/13, 14, 16, 725/34, 35, 36, 42, 44, 46, 91, 94, 131, 32, 9; 705/10, 26; 709/217

(56) References Cited

U.S. PATENT DOCUMENTS

| | | | | |
|---|---|---|---|---|
| 4,912,552 A | * | 3/1990 | Allison, III et al. | 358/84 |
| 5,389,964 A | * | 2/1995 | Oberle et al. | 348/9 |
| 5,600,364 A | * | 2/1997 | Hendricks et al. | 348/1 |
| 5,724,521 A | * | 3/1998 | Dedrick | 395/226 |
| 5,794,210 A | | 8/1998 | Goldhaber et al. | |
| 5,848,396 A | * | 12/1998 | Gerace | 705/10 |
| 5,892,536 A | * | 4/1999 | Logan et al. | 348/13 |
| 5,948,061 A | * | 9/1999 | Merriman et al. | 709/219 |
| 6,002,393 A | * | 12/1999 | Hite et al. | 345/327 |
| 6,100,916 A | * | 8/2000 | August et al. | 348/5.5 |
| 6,282,713 B1 | * | 8/2001 | Kitsukawa et al. | 725/36 |
| 6,446,261 B1 | * | 9/2002 | Rosser | 725/34 |
| 6,477,704 B1 | * | 11/2002 | Cremia | 725/35 |

FOREIGN PATENT DOCUMENTS

| | | |
|---|---|---|
| EP | 0 424 648 A | 2/1991 |
| WO | WO 99 04561 A | 1/1999 |
| WO | WO 99 45702 A | 9/1999 |
| WO | WO 99 52285 A | 10/1999 |

OTHER PUBLICATIONS

U.S. patent application Ser. No. 08/779,306, Batten et al., filed Jan. 6, 1997.

* cited by examiner

*Primary Examiner*—Andrew Faile
*Assistant Examiner*—Matthew R Demicco
(74) *Attorney, Agent, or Firm*—Shaw Pittman LLP

(57) ABSTRACT

A method and system for providing targeted advertisements over a networked media delivery system, especially interactive television networks, the system comprising tracking and storing viewer selections, analyzing the selections, and delivering targeted advertisements that appeal to the particular subscriber making the selections, the system including a merge processor, a file server, a profile processor, and a broadcast server contained in a head end in communication with a plurality of set-top boxes through a distribution network. Based on a subscriber's viewing habits and account information, the present invention delivers different, customized advertisements to different viewers watching the same program or channel. The present invention delivers the advertisements as either still frame bit maps or as video streams advertisement insertion in a playlist or a broadcast media program.

29 Claims, 5 Drawing Sheets

METHOD AND SYSTEM FOR PROVIDING TARGETED ADVERTISEMENTS

This application is a continuation-in-part of application Ser. No. 08/779,306, entitled "Method and System for Tracking Network Use," by Batten, Grauch, Danner, Stefanik, and Swix, filed Jan. 6, 1997 now abandoned, which is assigned to the assignee of the present invention and is hereby incorporated by reference. Accordingly, the present invention claims the benefit of the filing date of that earlier filed application.

BACKGROUND

1. Field of the Invention

The present invention relates to the field of networked media delivery systems, and more particularly, to a method and system for providing targeted advertisements to specific consumers.

2. Background of the Invention

Traditionally, the preferred method of advertising has been to broadcast an advertisement to a large audience via mass media such as newspapers, magazines, radio, and television. This mass media advertising strategy seeks to reach the most number of viewers to increase the odds of contacting the ones most likely to purchase the advertised product or service. Although a large viewing audience may see the advertisement, advertisers understand that only a small percentage of that audience has a real interest in purchasing the advertised product or service. To some extent, advertisers can increase the probability of reaching purchasing consumers by creating advertisements that appeal to those potential consumers and broadcasting the advertisements in media that those same consumers are most likely to view. However, even using a popular medium to a typical potential consumer, advertisers will exclude potential consumers that do not use the medium and will include viewers of that medium who have no desire to purchase the product or service. Because of this underinclusion and overinclusion, advertisers necessarily waste at least a portion of their budgets on consumers who are not in the market to buy their product or service.

To offset this unnecessary spending, advertisers continually strive to narrow advertising efforts to a targeted purchasing audience. As briefly stated above, one targeting method distributes advertisements in media content that attract demographic groups likely to purchase the advertised product or service. For example, television shows often appeal to a particular type of audience, marked perhaps by age, income, or education. Usually, the specific sponsors of the shows sell products that appeal to the same particular audience. Similarly, in print media, advertisers choose magazines and newspapers with the content, style, and geographic coverage that attract readers likely to be interested in the advertised products or services.

In another targeting method, advertisers pay the mass media to deliver advertisements as a part of the media content. This method embeds the advertisement in the media content such that the viewer must view the advertisement to view the media content. For example, some radio and television programs incorporate advertising pitches into the program commentary or discussions. Other targeting techniques display advertisements concurrently with the media content, such as with corporate sponsored scoreboard icons in the corner of a television screen, or with logos incorporated into uniforms or equipment (e.g., race cars) that are repeatedly shown during a sports event broadcast. Another embedded advertising technique has film actors or actresses that use the advertiser's products during their acting.

Although the targeting techniques described above focus on a smaller consumer audience, the overinclusion and underinclusion inherent in mass media advertising remain their principal drawbacks. In each targeting strategy, advertisers waste money by reaching people who are not interested in the product or service or by excluding those people who are interested. Because these techniques assess consumer interest on the larger scale of program audiences instead of on an individual viewer basis, the techniques will always suffer from the squandered advertising dollars associated with overinclusion and underinclusion.

To address the drawbacks to mass media, advertisers sometimes use direct mailings and niche print media to reach targeted consumer audiences. Direct mailings and niche magazines focus on specific potential purchasers or classes of purchasers. For example, a pharmaceutical company can use targeted mailings to deliver its advertising materials directly to doctors practicing the particular type of medicine to which the advertised drug applies. As another example, boat manufacturers can advertise in a small number of magazines directed to boating enthusiasts. While these targeted print advertisements increase the efficiency of advertising efforts, they lack the powerful and influential images and sounds that a medium such as television can deliver. Thus, targeted print advertisements have only limited application and impact.

Recognizing the drawbacks to mass media and targeted print advertisements, advertisers have turned to the internet to isolate potential consumers and increase the power of their advertising dollars. On the internet, a user controls the content she views by navigating the worldwide web and accessing web pages and web advertisements. Using software, advertisers can intelligently monitor these user viewing selections, analyze viewing patterns, and deliver advertisements suiting the tastes and interests of the user. For example, if a user has repeatedly chosen to view internet advertisements for camping equipment, the software will retrieve all camping equipment advertisements that subscribe to the advertising plan and deliver them to the user. In addition, the software can retrieve advertisements for related products, such as hiking gear, and display those advertisements to the user as well. U.S. Pat. No. 5,948,061 discloses a method of delivering, targeting, and measuring advertising over networks that is representative of these types of internet targeted advertisements.

Although these internet targeted advertisements marginally increase the spending power of the advertising dollar, they still present notable disadvantages. First, despite a growing popularity, the internet has far fewer users than traditional media such as newspapers or television. The cost of purchasing a computer and maintaining internet access will continue to exclude potential consumers. In addition, many consumers, especially those of older generations, are intimidated by the seemingly complex internet technology and prefer the more familiar medium of television.

In addition to limited consumer audiences, bandwidth restrictions limit data transmission speed and hamper the quality and impact of targeted internet advertisements. Most internet users are thoroughly familiar with the long delays associated with downloading graphical information, especially video clips or other animation. These delays limit the types of advertisements that can be displayed and dampen the impact an advertisement can have on a user. Often, the consumer clicks through the web page without viewing the advertisement or occupies the downloading time with other activities such as watching television or reading.

Targeted internet advertising also has limited data from which to determine a customer profile. To collect data, the targeted internet advertising systems simply record user selections of internet advertisements, note words typed when searching web content, or read user information such as geographic location, domain type (e.g., commercial, education or government), and perhaps standard industry codes (SICs), which indicate such user characteristics as employer and type of employer. To target the advertising, the internet systems tend to deliver advertisements, e.g., banner advertisements, related to a user's previous advertisement selections or search terms without regard to the current and changing tastes of the user. In relying on previous advertisement selections or search terms, these internet systems miss the opportunity to display the types of advertisements that the user would be interested in, but has not yet seen or clicked through. Instead of being proactive and assessing a customer's tastes and delivering new, pertinent advertisements, these internet systems simply react to previous advertisement selections and deliver related advertisements.

SUMMARY OF THE INVENTION

The present invention is a system and method for providing targeted advertisements over a networked media delivery system. Broadly stated, the present invention tracks and stores viewing events (e.g., such as menu choices or changes in programming), analyzes the events, and delivers targeted advertisements that appeal to the particular subscriber generating the events. By collecting data on viewing habits and analyzing that data in light of other subscriber account information (from other subscriber databases), the present invention is able to intelligently select and display advertisements that offer products or services a viewer is truly interested in purchasing. Further, the present invention can deliver different advertisements to different viewers watching the same program or channel. Thus, the present invention reaches a large audience (e.g., a cable television audience), assesses the interests and tastes of each subscriber of that audience, and delivers advertisements to each subscriber for products or services that the subscriber is predisposed to purchase. The net result is a more efficiently spent advertising dollar for the sponsors and an increased profit margin for the network media providers.

As part of the present invention, the tracking and storing of event data is accomplished by use of a system for tracking network use, such as the Clickstream system of BellSouth Interactive Media Services. That network use tracking system is described in co-pending application Ser. No. 08/779, 306, entitled "Method and System for Tracking Network Use," by Batten, Grauch, Danner, Stefanik, and Swix, filed Jan. 6, 1997, which is assigned to the assignee of the present invention. As part of the present invention, event data gathered by a network use tracking system can include such viewing events as a channel viewed, a switch to another channel, use of a VCR or other ancillary device, or invocation of an interactive application and subscriber commands given to the system during the application. For identification and tracking, event data also includes a time stamp (to indicate, e.g., start and stop times) and the subscriber's set-top box identification.

The primary components of the present invention, as shown in FIG. 1, include a merge processor 100, a file server 102, a profile processor 104, and a broadcast server 105, connected to a plurality of set-top boxes 108. Together, these components record network use by individual subscribers, store and organize data associated with the network use, analyze the data to identify interests of an individual subscriber, classify the individual subscriber in a demographic group, and deliver an advertisement targeted for her demographic group to the individual subscriber. Merge processor 100, file server 102, and broadcast server 105 reside in a head end 110, typically operated by a media service provider, and are connected to a plurality of set-top boxes 108 through a distributed media delivery network 106, such as a satellite, cable, or fiberoptic network. Profile processor 104 also resides in head end 110 and is connected to merge processor 100 and file server 102.

A set-top box is a network media device comprising a microprocessor, a memory buffer for operating instructions and storage, and a control interface for receiving subscriber viewing commands from a remote control device or control panel. In addition to the term "set-top box," such a network media device is sometimes referred to as a set-top terminal, a cable converter, or a home communications terminal. One or more of these terms apply generally to devices that are coupled to or made a part of a display device that shows programming to a subscriber. In addition, as used in this specification and in the claims, the term "set-top box" also includes a personal computer or any other computational device that communicates with a media delivery network and performs the functions described herein. When it is connected to a viewing device, e.g., a television set at a subscriber premises, the set-top box responds to and records the viewing selections ("event data") of a subscriber. At predetermined intervals, the set-top box uploads this event data through the distributed network to the merge processor.

Merge processor 100 communicates with the plurality of set-top boxes through the distribution network. Merge processor 100 receives the event data from the set-top boxes, organizes the data, and stores the data in event lists arranged by subscriber account.

File server 102 stores display data to be delivered to the plurality of set-top boxes in response to a subscriber selection. For example, file server 102 can contain digital copies of pay-per-view movies or commercials. The display data can be in the form of text, graphic elements, bit maps, or video stream. Graphic elements are simple display images such as rectangles, lines, or circles. Bit maps define a display space, e.g., a still frame or picture, and define a color for each pixel or "bit" in the display space. Examples of graphic image file types that contain bit maps include GIF and JPEG files. Video streams are a series of frames or pictures that produce moving images or animation. Alternately, the display data could be a multimedia presentation, e.g., a Shockwave™, Flash™, or Java™ presentation.

In addition to storing and delivering display data, file server 102 also communicates with the plurality of set-top boxes, performing such functions as assigning each set-top box to a demographic group and directing each set-top box to tune to particular channels.

In contrast to the interactive sessions of file server 102, broadcast server 105 delivers a continuous stream of display data within a broadcast environment. Broadcast server 105 delivers multiple video streams on separate channels and, unlike file server 102, does not participate in dynamic interchange with the set-top boxes. Instead, the set-top boxes tune to the particular channels that contain programming corresponding to their individual demographic groups.

Profile processor 104 receives event data from merge processor 100 and additional data from several other sources to construct a consumer profile of a subscriber. In constructing a profile, profile processor 104 analyzes the data to identify a subscriber's viewing habits and corresponding interests. In addition to merge processor 100, the other data sources preferably include an interactive selection list from an interactive television database 120, subscriber data from a customer registration database 122, billing data from an accounting database 124, and perhaps questionnaire data from a survey database 126 that stores customers' specific responses to questions about their interests. Profile processor 104 uses an algorithm to systematically examine customer profile information, to determine the particular demographic group of the viewer, and to choose an advertisement that appeals to the interests of the viewer and the demographic group. Once the analysis is complete, profile processor 104 instructs file server 102 to deliver a particular advertisement to the set-top box of the viewer. Profile processor 104 performs data source analyses and issues instructions concurrently among multiple viewers so that multiple viewers watching the same show can receive different advertisements.

As is apparent to those skilled in the art, the present invention may be used with numerous types of networked media delivery systems. For example, the method or system of the present invention could be deployed on an interactive media delivery system or modified for use with a conventional cable television network, a wireless cable television network, or a home satellite television network.

Accordingly, it is an object of the present invention to provide a system and method for delivering targeted advertisements to the types of consumers most likely to purchase the advertised product or service.

It is another object of the present invention to provide targeted advertising that reaches a large audience, that monitors and assesses each viewer of that audience to determine purchasing interests, and that displays advertisements to each viewer corresponding to her purchasing interests.

It is another object of the present invention to use an easily accessible medium to deliver targeted advertisements to the consumers most likely to purchase the advertised product.

It is another object of the present invention to provide a targeted advertising system and method that displays both bit map and video stream advertising.

It is another object of the present invention to provide a means for displaying different commercials to individual viewers watching the same channel.

These and other objects of the present invention are described in greater detail in the detailed description of the invention, the appended drawings, and the attached claims. Additional features and advantages of the invention will be set forth in the description that follows, will be apparent from the description, or may be learned by practicing the invention.

DETAILED DESCRIPTION OF THE INVENTION

The present invention is a system and method for providing targeted advertisements over networked media delivery systems, such as interactive media delivery systems, conventional cable television networks, wireless cable television networks, home satellite television networks, and other media delivery systems that allow duplex communication (perhaps with the return path via a separate, e.g., telephone, network) to a set-top box coupled to a subscriber's display device, such as a television. As an overview, the present invention records the viewing selections of a subscriber, compiles the viewing selection data along with other available data (e.g., interactive purchasing or questionnaire data), analyzes the data to formulate a customer profile, matches the customer profile to a demographic group, and displays for the customer a bit map or video stream advertisement that is customized for the customer or the customer's demographic group.

System Architecture

Figure 1:
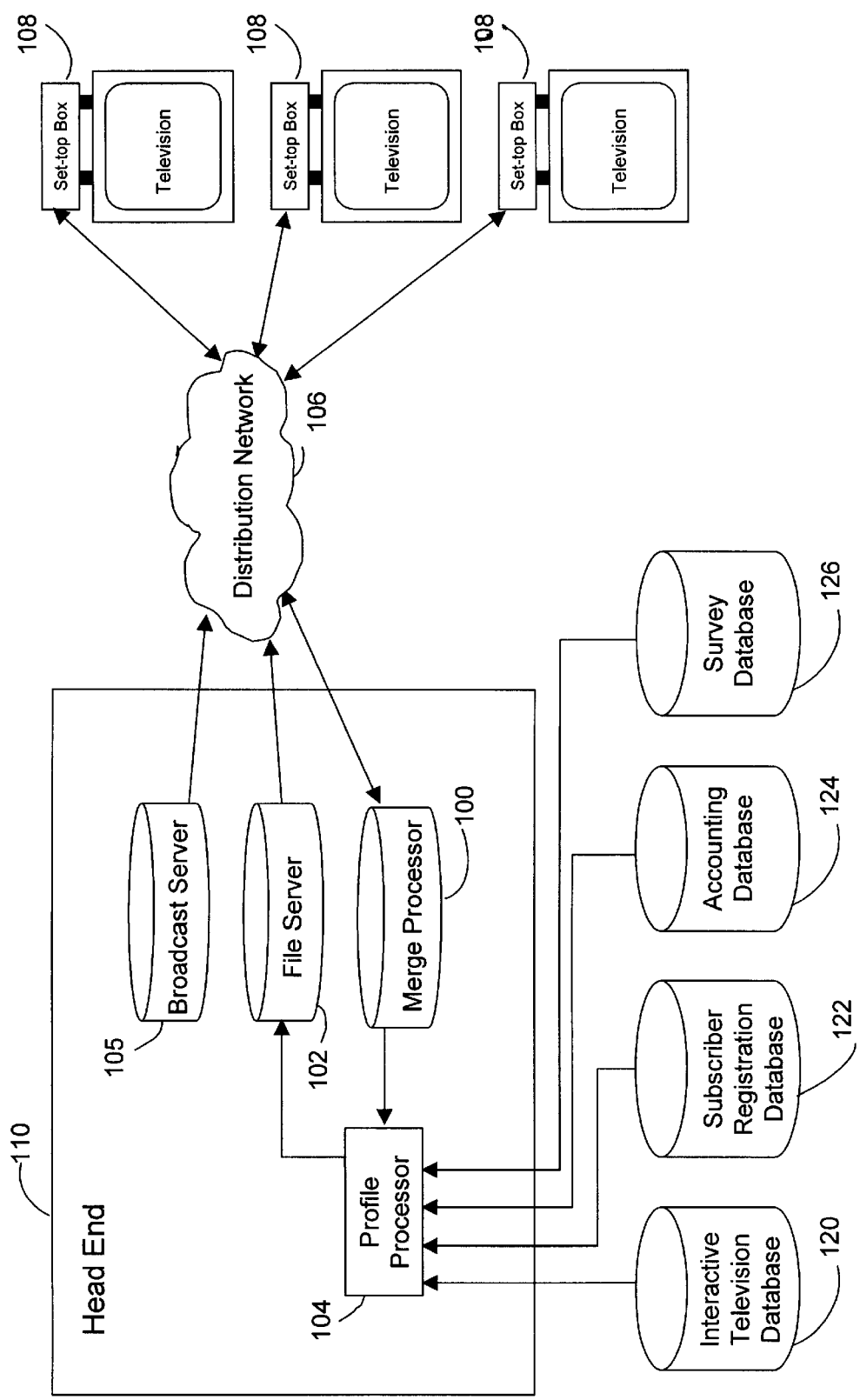
FIG. 1 is a schematic diagram of the system architecture of the present invention.
Figure 2:
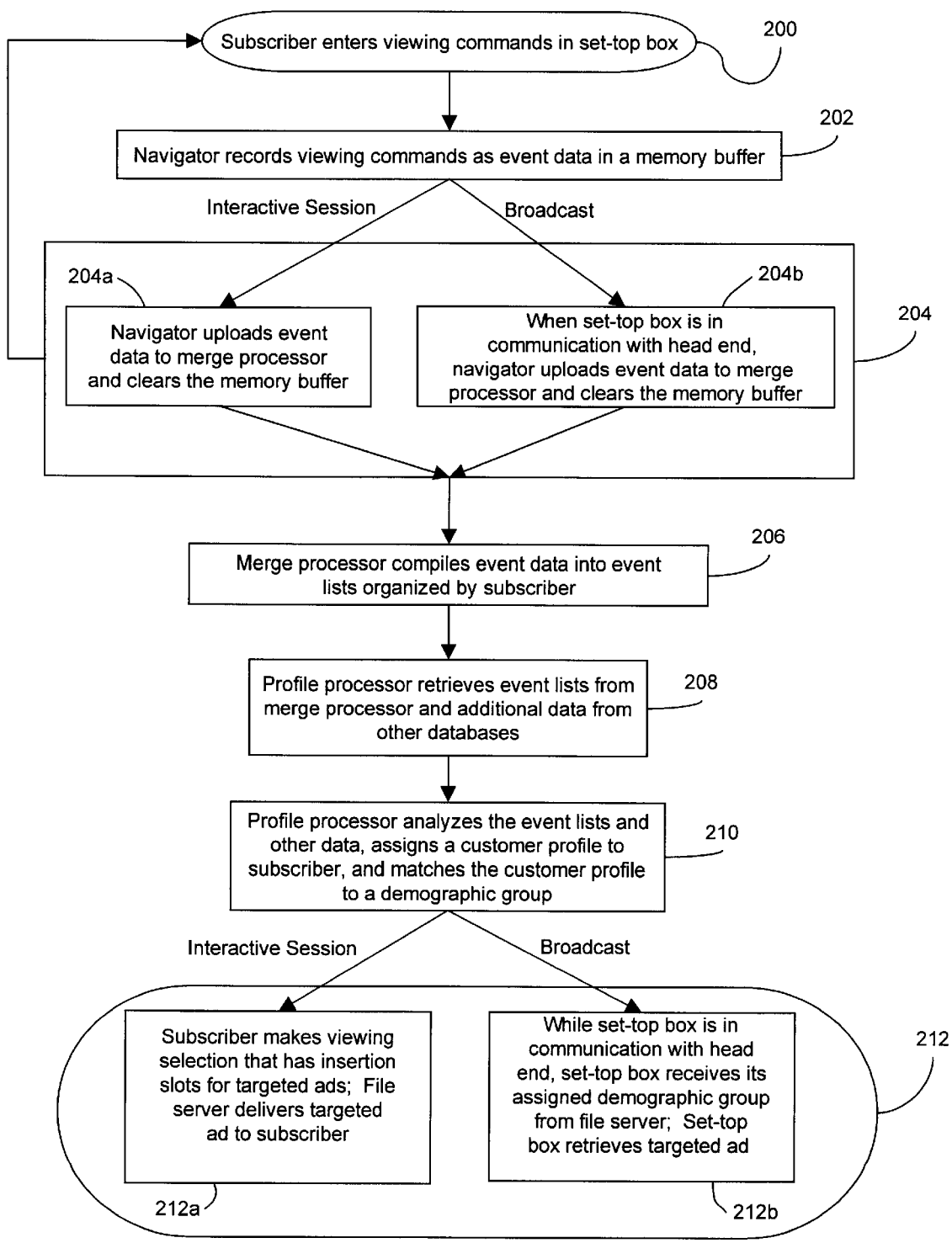
FIG. 2 is a flowchart outlining the method of delivering custom advertisements targeted to specific consumers.

Referring to FIG. 1, the present invention includes a merge processor 100, a file server 102, a profile processor 104, and a broadcast server 105. A head end 110, typically operated by a media service provider, houses merge processor 100, file server 102, profile processor 104, and broadcast server 105. Merge processor 100, file server 102, and broadcast server 105 connect to a plurality of set-top boxes 108 through a distribution network 106, which is any media delivery network such as a coaxial or fiberoptic cable system. Profile processor 104 is connected to both merge processor 100 and file server 102, as shown in FIG. 2. Each set-top box resides at a subscriber's premises, connected to a viewing device, e.g., a television.

Each set-top box of the plurality of set-top boxes 108 provides a control interface through which a subscriber makes viewing selections by, e.g., using a remote control unit, a keyboard, or a control panel. In providing this interface, a set-top box performs the following functions: (1) routes traditional broadcast signals to the connected viewing device; (2) converts media content to a selected video format (e.g., NTSC or PAL) and presents the content to the subscriber; (3) for interactive systems, exchanges messages (including display data) with merge processor 100 over distribution network 106; (4) receives messages from a subscriber input device, such as a remote control unit; (5) translates video signals from a network-native format into a format that can be used by the viewing device; (6) inserts alphanumeric or graphical information into the video stream to overlay that information on the video image; and (7) provides graphic or audio feedback to the subscriber. Examples of commercially available set-top boxes that satisfy these functions include an SA Explorer 2000 set-top box by Scientific Atlanta, a DCT-5000 set-top box by General Instruments, and a Z12C set-top box by Zenith.

With specific reference to the present invention, each set-top box completes many intelligent functions, including the collection, storage, exchange, and display of data. To satisfy these functions, the set-top box has a navigator, an operating system, and a memory buffer. The operating system is a computer program that, after being initially loaded into the set-top box by a bootstrap program, manages the other programs, or applications, running on the set-top box. The navigator is a software application running on top of the operating system. The navigator generates menu screens and accepts viewer menu selections such as movie orders, preview orders, or requests to watch an advertisement. Based on these selections, the navigator directs the file server to deliver the selected program, e.g., the server plays the selected movie. In addition, the navigator records viewer selections or event data in the memory buffer, and periodically (or on command) uploads the data through distribution network 106 to merge processor 100. Optionally, instead of the navigator, file server 102 could record the event data.

Merge processor 100 receives communications from the plurality of set-top boxes 108 through distribution network 106. The communications include the event data stored in the memory buffer of the plurality of set-top boxes 108. After receiving the event data, merge processor 100 organizes the data and stores the data in event lists arranged by subscriber account.

File server 102 stores the display data to be delivered to the plurality of set-top boxes 108. File server 102 delivers the data in response to subscriber viewing commands and instructions from profile processor 104. The display data can be in any form compatible with the networked media delivery system. However, the preferred forms are text, graphic elements, bit maps, and video stream. The content of the display data can be any media program, e.g., advertisements, television shows, news, movie trailers, movies, or still images, such as advertisement banners. Alternately, the display data could be a multimedia presentation.

Profile processor 104 performs the subscriber analysis and advertisement selection functions of the present invention. For subscriber analysis, profile processor 104 constructs a customer profile based on subscriber data and classifies the customer profile within a demographic group. For advertisement selection in an interactive session, profile processor 104 directs file server 102 to play an advertisement that appeals to the interests of the subscriber and the demographic group. Profile processor 104 performs subscriber analyses and issues instructions concurrently among multiple viewers so that multiple viewers watching the same show can receive different advertisements.

In addition to interactive sessions, profile processor 104 also targets advertisements within a broadcast environment in which several channels of programming, each corresponding to a different demographic group, are delivered to a customer. In FIG. 1, broadcast server 105 delivers the channels of programming in this broadcast model. To target the advertisements, file server 102 directs each set-top box to tune to a channel delivering an advertisement suitable for the customer's demographic group.

In constructing a customer profile, profile processor 104 receives the event data from merge processor 100 along with any other available data from other data sources. In the preferred embodiment of the present invention, profile processor 104 receives additional data from an interactive television database 120, a subscriber registration database 122, an accounting database 124, and a survey database 126. Interactive television database 120 provides data related to the services a customer has purchased or used over interactive television, such as video on demand. Subscriber registration database 122 provides all of subscriber data recorded at service initiation, such as a subscriber's address and employer. Accounting database 124 provides subscriber billing and purchasing information, such as service purchased, service rates, and payment aging. Finally, survey database 126 provides personal information gathered from subscribers using questionnaires that solicit responses about viewing habits and purchasing interests.

System Operation

Broadly stated, the operation of the present invention comprises collecting subscriber viewing selections, organizing and analyzing the selections, determining a subscriber's customer profile and demographic group, and delivering an advertisement targeted to the demographic group. In the preferred embodiment of the present invention, the system can deliver targeted advertisements as a part of an interactive television session or within a broadcast environment. Each method of delivery shares the same steps for gathering event data and analyzing a subscriber's interests.

FIG. 2 is a flowchart illustrating the steps involved in collecting and analyzing event data and delivering targeted advertisements for both the interactive session model and the broadcast model, according to a preferred embodiment of the present invention. While the steps described herein and illustrated in the flowchart contain many specific examples of information and media flow, these steps should not be construed as limitations on the scope of the invention, but rather as examples of steps that could be used to practice the invention. In step 200 of FIG. 2, a subscriber enters viewing commands into the set-top box using a remote control unit, a control panel, or another device. In step 202, the navigator provisioned on the set-top box records each command as event data in the memory buffer of the set-top box.

The navigator uploads the event data to merge processor 100 and clears the memory buffer in step 204. The time at which this upload occurs depends upon whether the system is delivering targeted advertisements as a part of an interactive television session or within a broadcast environment. For interactive sessions, the upload occurs at a predetermined interval or as commanded by merge processor 100, as shown in step 204*a*. For broadcast, the upload occurs when the set-top box first establishes communication with head end 110, as shown in step 204*b*. The upload also depends on whether the navigator or file server 102 is recording the event data. Although the flowchart and following description show the navigator performing this function, in an alternate embodiment of the present invention, file server 102 records and immediately processes the event data. Having file server 102 collect the event data is preferable for an internet application in which file server 102 is the web server.

Steps 200 through 204 repeat continually as the subscriber interacts with the networked media delivery system. The longer the subscriber interacts with the system, the more event data merge processor 100 will contain from which to analyze the subscriber's viewing habits and interests. In step 206, merge processor 100 compiles the event data into event lists organized by subscriber. With the event lists tabulated, merge processor 100 is ready to provide the information necessary to assess a subscriber's viewing interests.

In step 208, profile processor 104 retrieves the event lists from merge processor 100 to begin shaping a customer profile of the subscriber. In addition, profile processor 104 draws information from all available databases, including, for example, interactive television database 120, subscriber registration database 122, accounting database 124, and survey database 126. These databases provide profile processor 104 with additional subscriber information such as address, employer, income level, favored manufacturers, banking habits, and products purchased through interactive television.

By analyzing the event data and the subscriber data from the various databases, in step 210 profile processor 104 assigns a customer profile to the subscriber and matches the customer profile to a demographic group. Generally, this analysis involves searching the event lists and subscriber data for patterns such as key words, e.g., "action" movie or "western" movie, or repeatedly selected menu items, e.g., do-it-yourself home improvement videos. As a part of this search, merge processor 100 could count the number of key words cited, the number of menu item selections, or perhaps the amount of time the subscriber viewed particular menus, and if the number or amount exceeded a certain threshold, would assign the subscriber to a certain customer profile or demographic group. The method by which an individual media service provider analyzes the event data and subscriber data depends largely on the provider's particular market strategy and business resources. As such, the optimal analysis method will vary among different service providers.

Having assigned a customer profile and demographic group to the subscriber, the system is ready to retrieve and deliver a targeted advertisement when an advertisement slot becomes available, as called for in step 212. The method by which the system retrieves and delivers the advertisement depends on whether the system is delivering targeted advertisements as a part of an interactive television session (step 204a above) or within a broadcast environment (step 204b above). For an interactive session, as shown in step 212a, the subscriber makes a viewing selection that has advertisement insertion slots for targeted advertisements. In response, profile processor 104 chooses an advertisement corresponding to the subscriber's customer profile and demographic group, and file server 102 delivers the advertisement to the subscriber in a menu screen or playlist.

For the broadcast environment, as shown in step 212b, the set-top box receives its assigned demographic group from file server 102 when the set-top box first establishes communication with head end 110 or during subsequent communications. Based on the assigned demographic group, the set-top box then retrieves the corresponding targeted advertisements. In the broadcast environment, the method by which the set-top box retrieves the targeted advertisements varies. For example, if the advertisements are video streams, the set-top box could tune to broadcast channels delivering advertisements at the appropriate time, or, for bit map advertisements, the set-top box could tune to advertisements spooled in a broadcast carousel format.

As outlined in the flowchart of FIG. 2, in the preferred embodiment of the present invention, the system components deliver targeted advertisements in two principal ways. The first method displays bit map or video advertisements during an interactive television session as a part of menu screens or as a part of a dynamic advertisement insertion in a playlist, e.g., a playlist constructed in response to a pay-per-view movie order. The second method displays bit map or video stream advertisements as a part of a standard video broadcast.

The following descriptions and figures illustrate these methods of delivering targeted advertisements in more detail and according to preferred embodiments of the present invention. Although the present invention is applicable to any situation in which networked media delivery systems display advertisements to subscribers, the following descriptions and schematics trace the operation of the present invention in the context of bit maps and video streaming. While the method described herein and illustrated in the figures contains many specific examples of media flow steps, these steps should not be construed as limitations on the scope of the invention, but rather as examples of media flow steps that could be used to practice the invention. As would be apparent to one of ordinary skill in the art, many other variations on the system operation are possible, including differently grouped and ordered method steps. Accordingly, the scope of the invention should be determined not by the embodiments illustrated, but by the appended claims and their equivalents.

Each of the following methods for delivering targeted advertisements relies on the ability of head end 110 to identify a particular subscriber through the subscriber's set-top box. For each request for advertisement insertion, a set-top box can include its user identification so that head end 110 knows which event lists and database entries to consult. However, in the preferred embodiment of the present invention, the navigator of the set-top box identifies itself (and its subscriber) to head end 110 when the set-top box activates and establishes an interactive session. Thus, when the set-top box requests an advertisement insertion, head end 110 already knows the identity of the set-top box and its subscriber.

Interactive Session

For interactive sessions, the preferred embodiment of the present invention delivers targeted advertisements during 1) interactive menu screens, or 2) in a playlist created in response to the selection of a program (e.g., a pay-per-view movie).

The delivery of a targeted bit map and video advertisement during an interactive session requires a communication between a set-top box and head end 110. Specifically, the navigator on the set-top box recognizes an advertisement insertion slot and queries head end 110 for an advertisement to insert. Based on the customer profile or demographic developed in steps 200 through 210 of FIG. 2, file server 102 of head end 110 delivers a suitable targeted advertisement.

Figure 3:
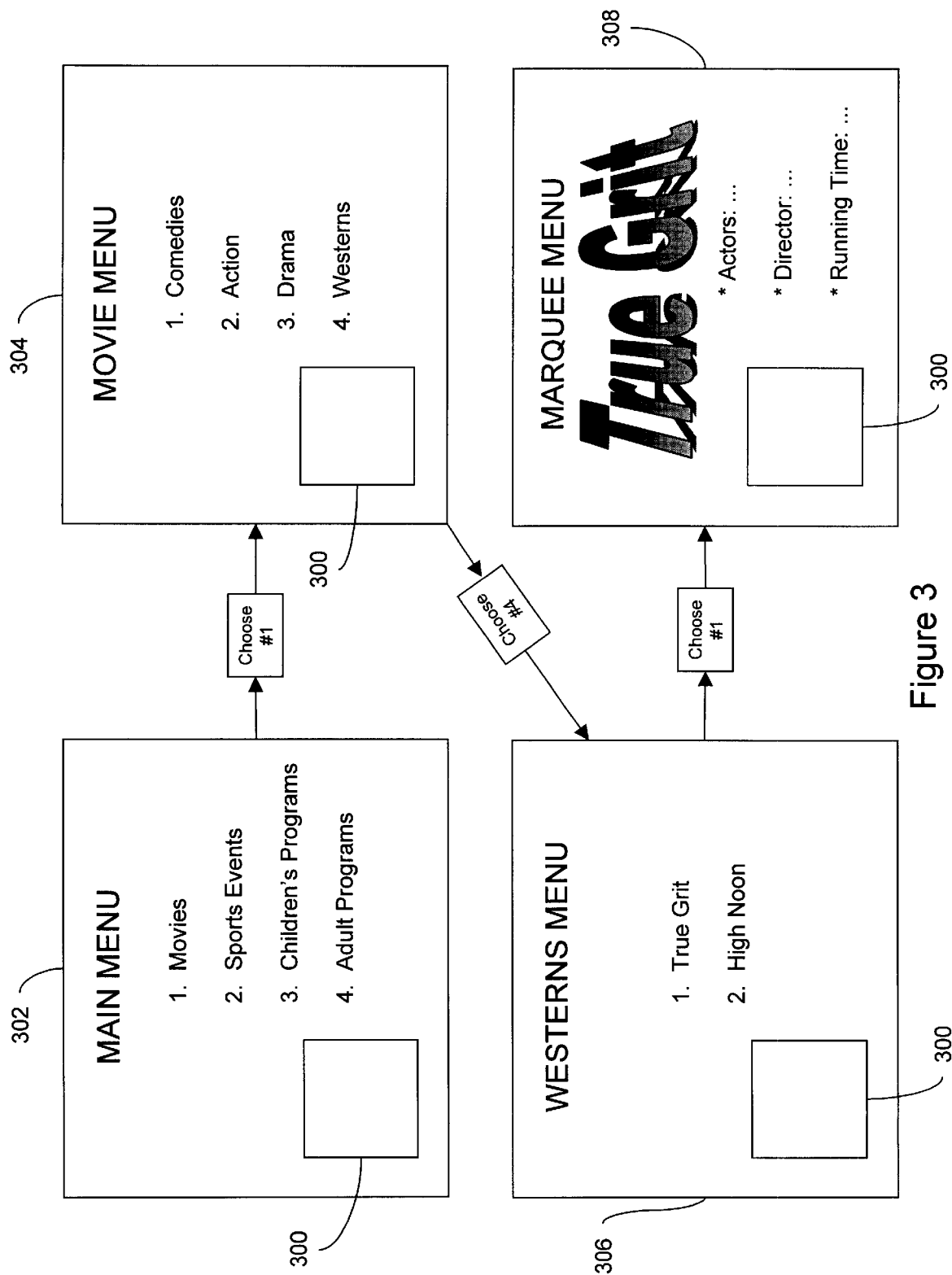
FIG. 3 is a schematic diagram illustrating progressive menu screens of a typical interactive television system.

1) Interactive Menu Screen:

In a preferred embodiment of the present invention, the advertisement insertion slot is in an interactive television menu screen. As an example, FIG. 3 shows progressive menu screens of a typical interactive television system. Each screen has an area 300 for displaying bit map or video advertisements forwarded by file server 102. In screen 302, the subscriber views the main menu having general viewing categories, such as movies, sports events, children's programs, and adult programs. After choosing "movies," in screen 304 the subscriber is presented with types of available movies, such as comedies, action, drama, and westerns. Upon choosing "westerns," screen 306 appears, giving the subscriber individual movie titles to order, such as "True Grit" and "High Noon." Finally, after ordering a particular movie, "True Grit," the interactive television system displays a marquee screen 308 that provides information about the movie, such as lead actors, director, and running time.

During this interactive session, the navigator records each subscriber selection as event data. In the preferred embodiment, the navigator uploads the latest event data to merge processor 100 every time a new targeted advertisement must be inserted. In this manner, profile processor 100 has the latest event data, along with the data from other databases, to assess a viewer's current interests. Thus, for example, in screen 302, the present invention could display a bit map or video movie trailer advertisement enticing the subscriber to look further into the menu options but not necessarily targeting a specific customer profile or demographic group. Then, once the subscriber has chosen "movies" and moved to screen 304, the present invention could display a bit map or video advertisement for popcorn knowing that this particular subscriber has watched several movies in the last month (from the event data) and that the subscriber indicated a liking for popcorn in a recent consumer spending survey (from survey database 126).

As an alternative to uploading event data to merge processor 100 when a new targeted advertisement must be inserted, the upload could occur at any time, regardless of whether an advertisement insertion slot is available. In this manner, the present invention could create and save a customer profile and playlist in advance, and display the advertisements the next time the customer begins an interactive session.

After choosing "westerns," in screen 306 the present invention could display an advertisement for a pickup truck based on the subscriber's interest in westerns (preferably, but not necessarily, from recent event data) and previous viewing selections focusing on truck and automotive programming (from event data). Finally, after ordering the movie "True Grit," the present invention could display a bit map or video advertisement promoting a western style restaurant chain based on the subscriber's interest in western movies (from event data) and the subscriber's previous inquiries about western style restaurants over the interactive television system (from interactive television database 120).

The selection of a bit map or video advertisement depends largely on the individual customer profile and the library of available advertisements. Both the customer profiles and the available advertisements are classified in demographic groups. Thus, the present invention delivers advertisements classified under a certain demographic group to subscribers having customer profiles classified under the same demographic group. Preferably, the volume of advertisements in the library is large enough to satisfy a large number of demographic groups, thereby allowing more customized advertisements.

The present invention delivers bit map or video advertisements from file server 102 to the plurality of set-top boxes 108. File server 102 can download each advertisement when a set-top box requests an advertisement for an advertisement insertion slot. However, in the preferred embodiment, file server 102 downloads a whole library of advertisements to the navigator memory buffer when the set-top box is initially activated and then instructs the navigator to retrieve from the buffer a certain advertisement and play that advertisement to the subscriber. Although storing the advertisements in the navigator memory buffer eliminates the delay associated with downloading bit maps or video each time one is displayed, this "look ahead" buffer strategy is limited by the cache size of the navigator memory. If the cache size is small and an advertisement cannot be stored, then the navigator simply reverts to querying file server 102 and waiting for the downloading of the bit map or video advertisement. Also, to save cache capacity, preferably, head end 110 initially screens the advertisements that are to be loaded ahead of time on the set-top box and removes the advertisements that would not appeal to that specific subscriber whatsoever. For example, advertisements for women's wear would be removed from delivery to a male-only household.

2) Playlist Advertisement Insertion:

The playlist advertisement insertion method composes a series of advertisements and a program in response to a subscriber's ordering of the program, e.g., a movie. Once the subscriber orders the program, profile processor 104 assembles a playlist including the program and advertisements preceding and succeeding the program, e.g., movie trailers for other movies or perhaps CD soundtracks of the ordered movie. Such a playlist resembles the content of most movie videos rented from vendors such as Blockbusters™.

Figure 4:
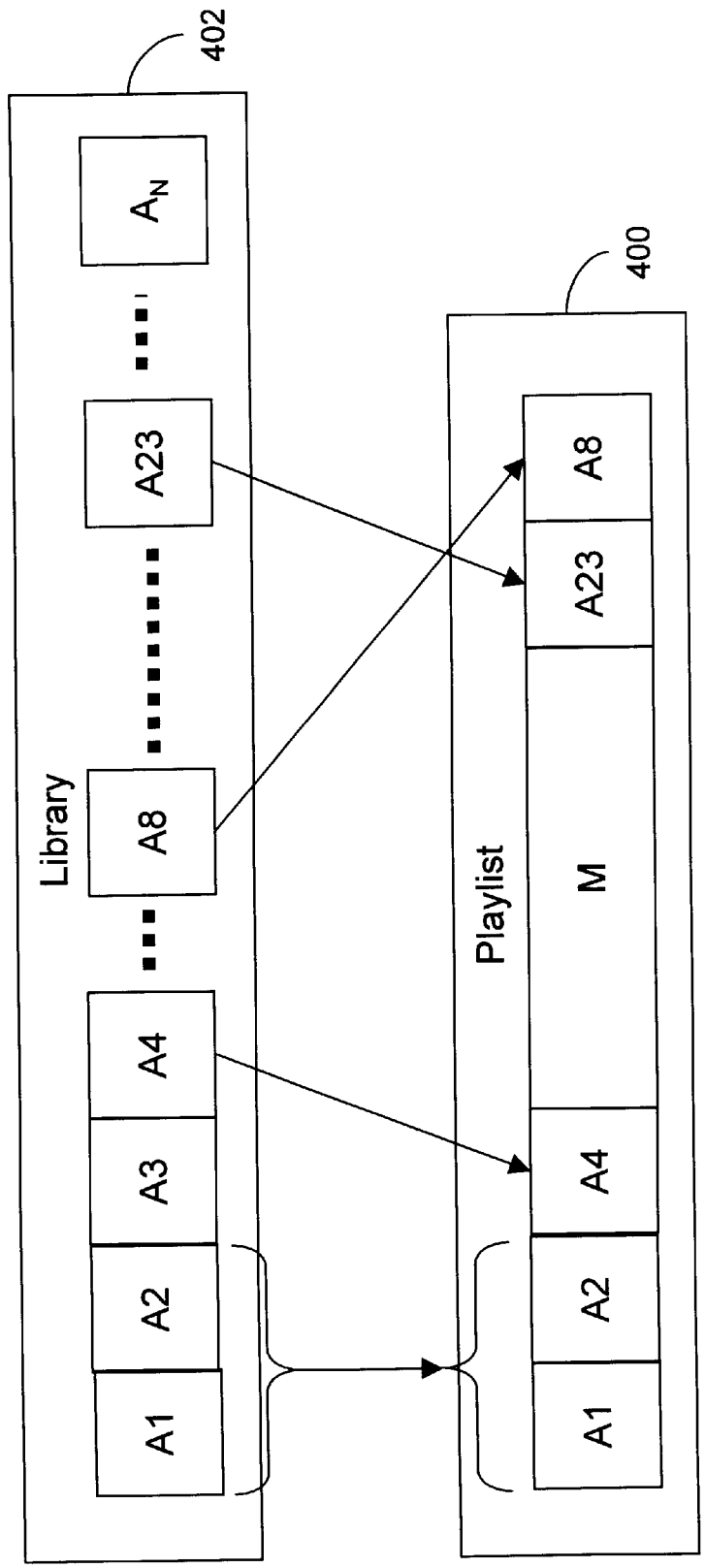
FIG. 4 is a schematic diagram of the advertisement insertion playlist method of the present invention, showing an advertisement library and a playlist.

As shown in FIG. 4, an example playlist 400 is three advertisements A1, A2, and A4, followed by the ordered movie M, followed by two advertisements A23 and A8.

Profile processor 104 chooses advertisements A1, A2, A4, A23, and A8 from library 402 based on the analysis performed in steps 208 through 212 of FIG. 2. Library 402 is stored in file server 102 (or, alternately, is downloaded to the navigator of a set-top box) and contains multiple advertisements A1 through $A_N$, each classified by customer profile or demographic group. Thus, once profile processor 104 has assigned a customer profile to the subscriber, it merely looks for advertisements matching the profile in library 402 and inserts those advertisements into playlist 400.

The playlist advertisement insertion method enables head end 110 to dynamically build playlist 400 immediately after the subscriber has ordered a program. Thus, profile processor 104 of head end 400 can use the latest available event data of the subscriber to deliver advertisements that appeal to the subscriber's most recent interests and viewing habits.

Example

An example of the video stream playlist method of the present invention is a pay-per-view movie service that shows commercials or movie trailers before and after a feature presentation. In this case, merge processor 100 would contain an event list of every viewing selection made by the subscriber up to the ordering of the movie. The event list could include data such as movie previews watched, movies watched, television programming watched, products ordered via interactive television, choices from interactive menus, commercials viewed, and commercials turned off. The historical extent of the data would depend on how long the present invention was active on the subscriber's television. In addition to event data, the media service provider would also have subscriber account information such as billing.

As the subscriber progresses through the pay-per-view menu screens, events (subscriber selections) are stored in the set-top box and periodically uploaded to the server. The server collects the data and organizes it into event lists. For example, the list may show that the viewer watched a movie trailer for a movie about white water rafting, then viewed an advertisement for outdoor adventure gear, then watched a movie trailer about a wilderness hiking disaster, and finally ordered the feature movie presentation about a wilderness survival competition.

According to the present invention, when the viewer orders the feature movie presentation, the pay-per-view service prepares to send the movie along with the commercials that will precede and follow the movie. At this point, profile processor 104 analyzes the event data and additional data, classifies the viewer in a certain demographic group, and delivers a commercial targeted for that group. As an example, given the viewer's interest in outdoor adventures, a suitable advertisement would be a commercial for a sport utility vehicle with specialized accessories that carry outdoor adventure gear. The present invention would deliver this advertisement as a full screen video stream played prior to or after the showing of the feature movie presentation.

Broadcast Advertisement Insertion

The broadcast advertisement insertion method inserts targeted advertisements at predetermined advertisement insertion slots in a continuous broadcast program. Broadcast server 105 delivers the continuous broadcast program in one channel and delivers other programs and advertisements in other channels. By this method, when an advertisement slot comes up, file server 102 directs each set-top box to switch for the duration of the advertisement insertion slot from the continuous broadcast program to a channel running an advertisement targeted for the individual subscriber of each set-top box. After the duration, at the end of the advertisement insertion slot, each set-top box switches back to the continuous broadcast program. Optionally, instead of file server 102, a separate component called a session controller or session manager (not shown in FIG. 1) could direct the set-top boxes to switch channels.

Figure 5:
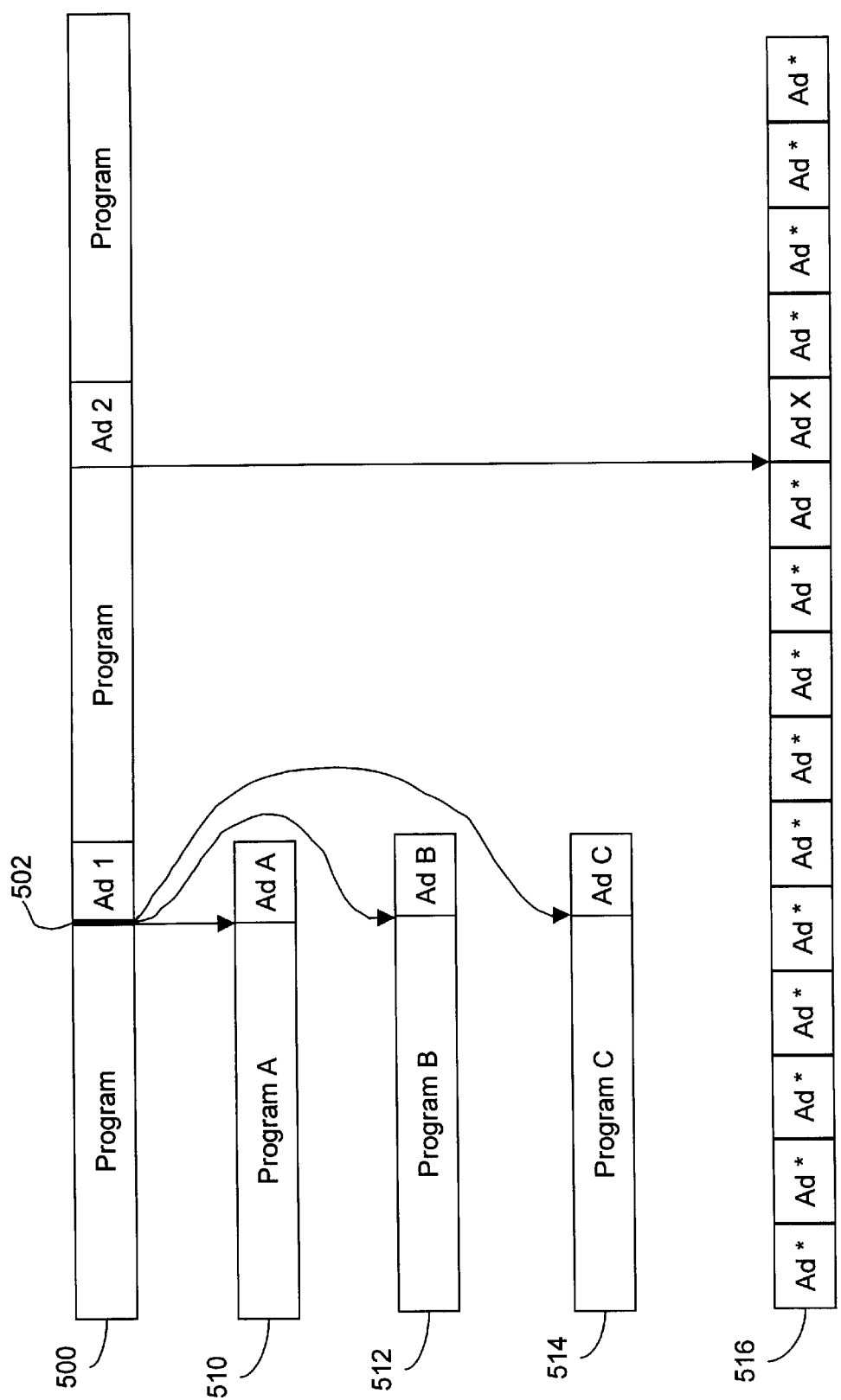
FIG. 5 is a schematic diagram of the broadcast advertisement insertion method of the present invention, showing the method by which set-top boxes switch from programming streams to advertisement insertion streams.

FIG. 5 illustrates the method by which the set-top boxes switch from the programming streams to the advertisement insertion streams. Program broadcast 500 is a continuous broadcast running on a particular quadrature amplitude modulation (QAM) channel in a particular program identification (PID). In FIG. 1, broadcast server 105 delivers this program broadcast 500. The continuous broadcast indicates the beginning of an advertisement insertion slot with a signal in the broadcast transmission, known as a q-tone 502. Ad 1 in program 500 would be, for example, a national advertisement that is not targeted. In contrast, Ad A, Ad B, and Ad C would be targeted local advertisements running on broadcasts 510, 512 and 514, respectively. Program broadcast 500 and broadcasts 510, 512, and 514 would each have different PIDs.

Thus, at q-tone 502, head end 110 communicates to each set-top box two items of tuning information. Knowing the customer profile or demographic group of the subscribers, head end 110 tells each set-top box 1) which PID to tune to, and 2) for how long, i.e., the duration of the advertisement insertion slot. Accordingly, the set-top boxes off-tune to the separate advertisement channel for the specified duration and tune back to program broadcast 500 after the advertisement insertion slot to resume watching the continuous broadcast program. In this manner, two subscribers watching the same program broadcast 500 can receive two different advertisements appealing to their individual tastes and viewing habits.

The separate advertisement channel can be either another programming channel whose advertisement insertion slots coincide with program broadcast 500 or can be a continuous stream of advertisements with no programming. The continuous stream of advertisements is preferred if the intervals of the advertisements line up with the programming channels that switch to it. In FIG. 5, channel 516 represents a continuous stream of advertisements to which program broadcast 500 can off-tune, e.g., to off-tune to Ad X for advertisement insertion slot 2. Optionally, instead of tuning to video advertisements, a set-top box could retrieve bit map advertisements spooled in a broadcast carousel format.

The advantage of off-tuning the set-top box is a savings in bandwidth. Instead of delivering a separate video stream with targeted advertisements to each demographic group of subscribers, the off-tuning uses only one continuous broadcasting channel and tunes to other channels to deliver targeted advertisements.

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

What is claimed is:

1. A method for providing targeted advertisements over a media delivery network from a head end during an interactive session, comprising:

collecting event data of a subscriber on a server, wherein the event data comprises the subscriber's selection of programs on a set-top box from an interactive menu screen;

analyzing the event data and information of the subscriber to assign a demographic group and a customer profile to the subscriber;

selecting an advertisement that appeals to the customer profile and the demographic group of the subscriber; and displaying the advertisement to the subscriber upon receiving an advertisement request from the set-top box for an advertisement insertion slot; and wherein the event data includes latest event data that are uploaded by the set-top box to the head end when a new targeted advertisement is to be inserted.

2. The method of claim 1, wherein analyzing the information of the subscriber includes analyzing account information of the subscriber.

3. The method of claim 2, wherein analyzing the event data and the information of the subscriber comprises invoking an algorithm that looks for patterns in the selections of programs and the account information.

4. The method of claim 3, wherein the patterns are selected from the group consisting essentially of key words appearing in the selections of programs over a threshold number of times, key words appearing in the account information over a threshold number of times, and amount of time spent viewing a menu over a threshold amount of time.

5. The method of claim 1, wherein displaying the advertisement comprises delivering a bit map to the set-top box of the subscriber, wherein the set-top box displays the bit map on a screen.

6. The method of claim 5, wherein the bit map is delivered by the server in response to a request from the set-top box.

7. The method of claim 5, wherein the bit map is delivered by the server to the set-top box when the set-top is activated.

8. The method of claim 1, wherein the information of the subscriber includes at least one of accounting information, interactive television information, subscriber registration data, and survey information.

9. The method of claim 1, further comprising delivering a library of advertisements and instructions to the set-top box, wherein the instructions are used to instruct the set-top box to retrieve and display a certain advertisement of the library of advertisements that meets the customer profile of the subscriber.

10. The method of claim 1, wherein the advertisement is displayed in the interactive menu screen.

11. A system for providing targeted advertising over a media delivery network during an interactive session comprising:

a head end having a merge processor, a profile processor, a file server, and a broadcast server;

a distribution network connected to the head end; and at least one set-top box connected to the distribution network, wherein the merge processor collects viewing selections from the at least one set-top box, wherein the viewing selections are collected from a subscriber's selections of programs on the at least one set-top box from an interactive menu screen, and wherein the profile processor receives the viewing selections from the merge processor, analyzes the viewing selections along with account information, assigns a demographic group and a customer profile to the subscriber, and, upon receiving a request for a targeted advertising insert from the at least one set-top box, directs the file server to deliver the targeted advertising to the at least one set-top box based on the analysis of the viewing selections, and wherein the at least one set-top box uploads the viewing selections to the merge processor when requesting the targeted advertising insert.

12. The system of claim 11, wherein each set-top box of the plurality of set-top boxes comprises a navigator, a memory buffer, and an operating system.

13. The system of claim 12, wherein the navigator is a software application that runs on top of the operating system, generates menu screens, accepts viewer selections, records the viewer selections in the memory buffer, directs the file server to deliver a selected program, and uploads viewer selections to the merge processor.

14. The system of claim 11, wherein the plurality of set-top boxes is in communication with the broadcast server, the file server, and the merge processor.

15. The system of claim 11, wherein the profile processor is in communication with the merge processor and the file server.

16. The system of claim 11, further comprising a plurality of databases in communication with the profile processor.

17. The system of claim 16, wherein the plurality of databases comprises databases selected from the group consisting essentially of an interactive television database, a subscriber registration database, an accounting database, and a survey database.

18. The system of claim 11, wherein the media delivery network is selected from the group consisting essentially of an interactive media delivery system, a cable television network, a wireless cable television network, a satellite television network, and a media delivery system that allows duplex communication with the plurality of set-top boxes.

19. The system of claim 11, wherein the file server delivers the targeted advertising in the interactive menu screen.

20. A system for providing targeted advertising over a media delivery network during an interactive session comprising:

a head end comprising:
a file server for delivering advertisements;
a merge processor that stores subscriber event data;
a profile processor that analyzes subscriber event data, determines demographics, assigns customer profiles, and issues display instructions;

a plurality of set-top boxes connected to the head end, each set-top box comprising a processor for:
collecting a plurality of event records that describe selected commands from a subscriber to a particular set-top box, wherein the plurality of event records are collected from the subscriber's selections of programs on a set-top terminal from an interactive menu screen, said plurality of event records making up the event data;
uploading latest event data to the merge processor when a new targeted advertisement is to be inserted; and
receiving from the head end targeted advertisements and commands to display certain advertisements, wherein the file server receives the display instructions from the profile processor and delivers advertisements corresponding to the display instructions to the plurality of set-top boxes for display.

21. The system of claim 20, wherein the file server delivers bit map advertising.

22. The system of claim 20, wherein the file server delivers video stream advertising.

23. The system of claim 20, wherein the file server delivers the advertisements in the interactive menu screen.

24. A method for providing advertisements targeted at individual viewers during an interactive session comprising:
providing a set-top box to each of the individual viewers, wherein the set-top box is connected to a head end;
tracking the individual viewers' viewing selections and storing the viewers' viewing selections as event data, wherein the event data comprises the viewer's selections of programs on the set-top boxes from an interactive menu screen, and wherein the event data are uploaded to a head end when a new targeted advertisement is to be inserted;
analyzing the event data to compile a profile for each viewer; and
upon receiving a request from the set-top box for inserting targeted advertisements, delivering advertisements targeted to at least one viewer according to the at least one viewer's profile.

25. The method of claim 24, comprising recording commands received from a control panel in communication with the set-top box to track the individual viewer's program selections.

26. The method of claim 24, comprising downloading bit maps from the head end to the set-top box to deliver targeted advertisements.

27. The method of claim 24, comprising tuning the set-top box to an advertising video stream to deliver targeted advertising.

28. The method of claim 27, wherein the advertising video stream is supplied by the head end.

29. The method of claim 24, wherein the advertisements are delivered to the set-top box in the interactive menu screen.

* * * * *